July 7, 1925.  1,545,367
J. T. TICE
COTTON BALE OPENING AND MIXING APPARATUS
Filed July 28, 1924   2 Sheets-Sheet 1

John T. Tice
INVENTOR
BY Victor J. Evans
ATTORNEY

WITNESS:

July 7, 1925.  
J. T. TICE  
1,545,367  
COTTON BALE OPENING AND MIXING APPARATUS  
Filed July 28, 1924   2 Sheets-Sheet 2
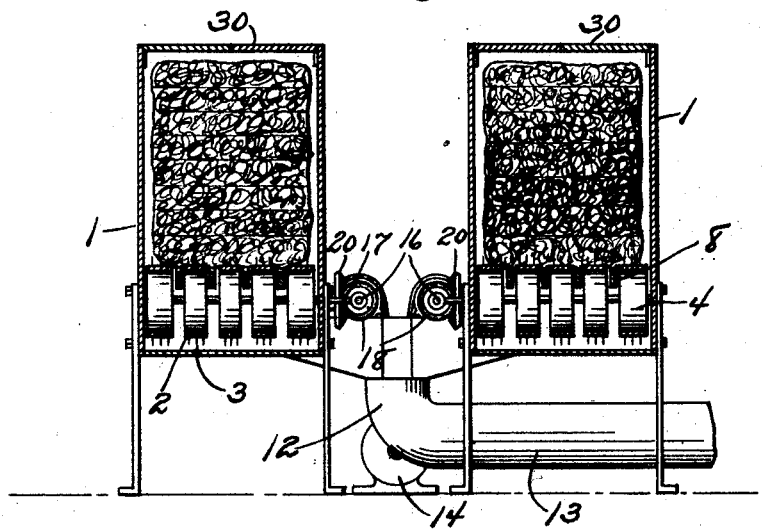
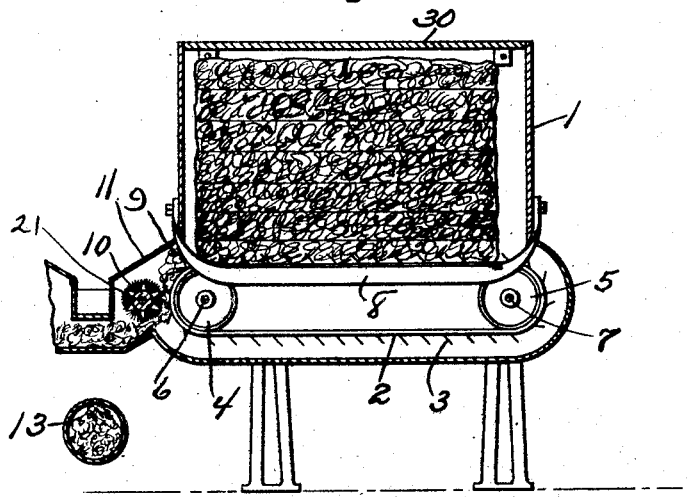
John T. Tice
INVENTOR Patented July 7, 1925.

1,545,367

UNITED STATES PATENT OFFICE.

JOHN T. TICE, OF LAGRANGE, GEORGIA.

COTTON BALE OPENING AND MIXING APPARATUS.

Application filed July 28, 1924. Serial No. 728,802.

*To all whom it may concern:*

Be it known that I, JOHN T. TICE, a citizen of the United States, residing at Lagrange, in the county of Troup and State of Georgia, have invented new and useful Improvements in Cotton Bale Opening and Mixing Apparatus, of which the following is a specification.

One object of my said invention is the provision of a cotton bale opening and mixing apparatus of such character that there is no danger of fire spreading in the event of a fire starting in the apparatus, and hence such a fire will entail the loss of a small amount of cotton only.

Another object of the invention is the provision of an apparatus which when properly operated will assure perfect automatic mixing of cotton when different grades of cotton are fed to the apparatus, thus bringing about a good running product from the lower grades of cotton.

To the attainment of the foregoing, the invention consists in the improvement as hereinafter described and definitely claimed.

In the accompanying drawings, forming part of this specification:—

Figure 2 is a transverse section taken in the plane indicated by the line 2—2 of Figure 1.

Figure 3 is a longitudinal vertical section taken in the plane indicated by the line 3—3 of Figure 1.

Similar numerals of reference designate corresponding parts in all of the views of the drawings.

Figure 1:
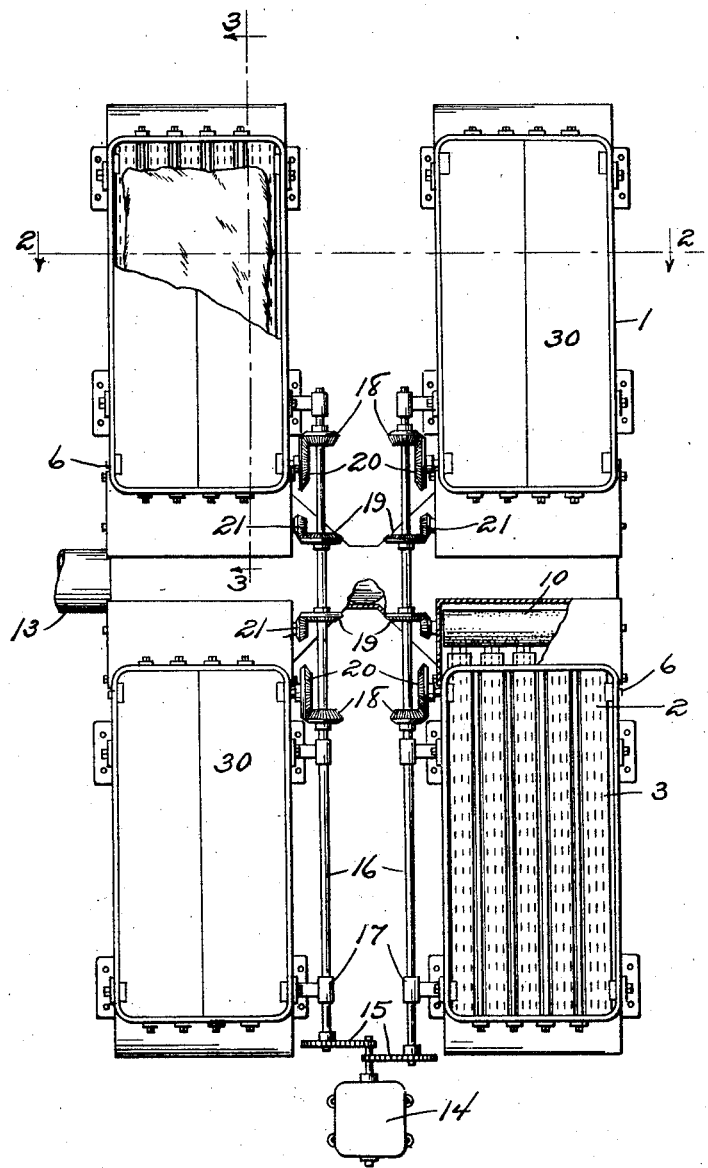
Figure 1 is a top plan view, partly broken away, illustrating the preferred embodiment of my invention.

Among other elements my novel apparatus comprises a plurality of boxes 1 of fire proof material, preferably of steel for the sake of strength and durability.

I prefer to arrange the boxes 1 after the manner shown in Figure 1, though they may be arranged in any other appropriate manner without involving departure from the scope of my claimed invention. I would also have it understood that by preference the corners at the bottoms of the boxes and the ends thereof are rounded as brought out in Figure 3.

In the lower portion of each box are arranged belts 2 bearing spikes 3, the said belts being disposed in parallelism and being mounted on drive pulleys or gears 4 and on idler pulleys or gears 5, Figure 3. The drive gears 4 are fixed to shafts 6 while the idler gears 5 are supported by shaft 7.

In the lower portion of each box 1 is a grating 8 for supporting a bale of cotton, said gratings being preferably arranged as shown in Figure 2 relative to the upper stretches of the belts 3.

Associated with an eduction opening 9 at the inner end of each box 1 is a delivery brush 10, arranged in a casing 11, Figure 3, the several casings 11 being arranged to discharge into a hopper 12, and the said hopper 12 being in connection with a suction pipe 13.

At 14 is a motor, preferably an electrical motor, the drive shaft of which is properly connected at 15 with longitudinal shafts 16, journaled in appropriate bearings 17. The said shafts 16 are provided with miter gears 18 and 19, the gears 18 being meshed with complementary gears 20 on the shafts 6, and the gears 19 being meshed with complementary gears 21 on the shafts of the rotatable delivery brushes 10.

At 30 are the doors of the boxes 1, the said doors being fire-proof and being by preference trap doors.

In the practical operation of my novel apparatus bales of cotton are placed in the boxes 1 with the narrow sides of the bales toward the bottom of the boxes. It is within the purview of my invention to make the boxes 1 of any desired depth so that each box may contain as many bales of cotton as desired. The weight of the bale or bales of cotton in each box 1 is imposed on the gratings 8, above which the teeth or spikes 3 on the belts 2 extend to a slight extent whereby the teeth or spikes are enabled when the belts are driven, to deliver the cotton to the brushes 10 which operate to clean the cotton from the spiked belts and to deliver the cotton to the hopper 12. Cotton from the several boxes 1 or other desired quota of said boxes is delivered into the hopper 12 at the same time and at any rate of speed desired to assure a mixing of proper proportion. I would also have it understood that it is within the purview of my invention to change and regulate the speed of delivery from any box 1 in a group or battery of boxes, and this independently of the deliveries from the remainder of the boxes in the group. For example cotton may be delivered from one box at a different rate of speed and consequently in a volume different from the deliveries from the other boxes. From this it follows that my novel apparatus embodies two means for regulating the proportions of each grade of cotton going into a particular mix.

In the above connection it will be understood that the apparatus can be regulated and the speed changed by changing the beveled gears on the shafts 6.

In the practical use of my novel apparatus, the apparatus is disposed beneath the floor of an opener room and within a basement casing of cement or other fire proof material. The side of the floor above and adjacent to the apparatus is lined with fire proof material, and when desired sprinkler heads may be disposed in the basement above the apparatus.

When the novel apparatus is disposed as stated, destructive fires in the opener room will be practically eliminated, inasmuch as only the number of bales necessary for the operation of the apparatus need to be in the opener room at one time. This will be appreciated as materially advantageous when it is stated that under extant systems of mixing cotton from ten to fifty bales of cotton are opened at one time and are exposed to damage by fire before they can be removed.

It will also be appreciated that in the operation of my novel apparatus the mixing is effected by mechanical means and the mixture or percentage of any one grade in the total mix will not vary provided the boxes 1 are kept full. The uniform mixture effected by the operation of my novel apparatus renders it feasible to use cheap grades of cotton and yet obtain a good running product for the cards and spinning frames.

From the suction pipe 13 the cotton passes through a cleaning trunk (not shown), calculated to remove dirt, leaves and other foreign matter from the cotton before the delivery of the cotton to a breaker (also not shown).

I prefer to employ trap doors 30 on the boxes 1 for the support of bales placed on the said trap doors, and when the trap doors are sprung and the bales dropped through the floor of the opening room, the bales will bring up against the gratings 8 which are made heavy in order to withstand the shock and strain.

It will be apparent from the foregoing that the primary purpose of the teeth 3 on the belts 2 is to tear cotton from the bales, and in this connection I would have it understood that the teeth or spikes may be carried by belts such as 2.

Notwithstanding the practical advantages ascribed to my novel apparatus, it will be noted that the said apparatus is simple and inexpensive in construction and well adapted to withstand the usage to which cotton handling apparatus is ordinarily subjected.

I have specifically described the construction and relative arrangement of the parts in the preferred embodiment of my invention in order to impart an exact understanding of the said embodiment. I do not desire, however, to be understood as confining myself to the said specific construction and relative arrangement of parts inasmuch as the scope of my invention is defined by my appended claims, and within said claims modifications may be made without departure from my invention.

Having described my invention, what I claim and desire to secure by Letters-Patent, is:—

1. A cotton bale opening and cotton mixing apparatus, comprising a hopper, means for conducting cotton therefrom, a battery of boxes of fire-proof material having discharges to said hopper, open-work means in the boxes for supporting bales of cotton therein, means in the boxes for taking cotton from the bales, and means for effecting delivery of cotton from said taking means to said hopper.

2. A cotton bale opening and cotton mixing apparatus, comprising a hopper, means for conducting cotton therefrom, a battery of boxes of fire proof material having discharges to said hopper, open work means in the boxes for supporting bales of cotton therein, means in the boxes for taking cotton from the bales, and means for effecting delivery of cotton from said taking means to said hopper; each of said boxes having fire proof trap doors.

In testimony whereof I affix my signature.

JOHN T. TICE.